United States Patent [19]

Asen et al.

[11] 4,172,902

[45] Oct. 30, 1979

[54] STABLE FOODS AND BEVERAGES CONTAINING THE ANTHOCYANIN, PEONIDIN 3-(DICAFFEYLSOPHOROSIDE)-5-GLUCOSIDE

[75] Inventors: Samuel Asen, Silver Spring; Robert N. Stewart; Karl H. Norris, both of Beltsville, all of Md.

[73] Assignee: The United States of America as represented by the Secretary of Agriculture, Washington, D.C.

[21] Appl. No.: 910,152

[22] Filed: May 26, 1978

[51] Int. Cl.² ............................................. A23L 1/275
[52] U.S. Cl. ..................................... 426/250; 426/540
[58] Field of Search ................ 426/250, 540, 429, 426

[56] References Cited

U.S. PATENT DOCUMENTS 4,115,595  9/1978  Jordan .................................. 426/250
4,118,516  10/1978  Van Praag et al. .................. 426/250

OTHER PUBLICATIONS

Asen; R., Anthocyanin and pH Involved in the Color of "Heavenly Blue" Morning Glory, Phytochem., vol. 16, 1977, pp. 1118–1119.
Anthocyanins as Food Colors, Food Technology, May 1975, pp. 29–30.

*Primary Examiner*—Jeanette M. Hunter
*Attorney, Agent, or Firm*—M. Howard Silverstein; William E. Scott; David G. McConnell

[57] ABSTRACT

A colorant from a natural source which produces a wide range of stable colors in food and beverages which have a pH range of 2.0 to about 8.0 is added to foods and beverages in effective proportion. The colorant is the anthocyanin from 'Heavenly Blue' Morning Glory, peonidin 3-(dicaffeylsophoroside)-5-glucoside.

2 Claims, No Drawings

STABLE FOODS AND BEVERAGES CONTAINING THE ANTHOCYANIN, PEONIDIN 3-(DICAFFEYLSOPHOROSIDE)-5-GLUCOSIDE

BACKGROUND OF THE INVENTION

1. Field of the Invention

This invention relates to a naturally occurring anthocyanin from 'Heavenly Blue' Morning Glory and more is specifically to its use in coloring food products.

2. Description of the Prior Art

It is known that most naturally occurring anthocyanins are highly colored at pH's below 3 but it is also well know that they are virtually colorless in an environment having pH values above 3.0 (Acta Horticulturae 63, 217-223, 1976). It is also known in the art that anothocyanins acylated with caffeic acid are stable in neutral solution (Bot. Mag. Toyko 87, 33-40, 1974, and Phytochemistry 16, 1118-1119, 1977) and that the major anthocyanin in 'Heavenly Blue' Morning Glory, peonidin 3-(dicaffeylsophoroside)-5-glucoside, is one of the few natural anthocyanins acylated with caffeic acid (Phytochemistry, ibid.). Other studies concerning the anthocyanin in morning glory and other plants and natural colors from a variety of sources have also been reported (Kumanato, J. Sci. Biol. 12, 41-70, 1975; Food Engineering 49, 66-72, 1977).

BRIEF SUMMARY OF THE INVENTION

An object of this invention is to provide a food colorant from a natural source.

Another object is to provide a single colorant for use in producing a wide range of stable colors in food and beverages at pH values from about 2.0 to about 8.0.

According to this invention the above objects are accomplished by a colorant, peonidin 3-(dicaffeylsophoroside)-5-glucoside, an anthocyanin isolated from the blue morning glory, Ipomoea tricolor Cav cv Heavenly Blue which is characterized by the stability of colors ranging from purplish-red to blue produced in food and beverage products at pH values from about 2.0 to about 8.0.

DETAILED DESCRIPTION OF THE INVENTION

Although it is well known that naturally occurring anthocyanins are highly colored and that the color is greatly influenced by pH, it is also known that as the pH is raised the anthocyanins are converted to very unstable purplish anhydro bases that are almost immediately converted to colorless carbinol bases. A typical property of anthocyanins is that they lose their color at pH values above 3.0 Consequently, we were surprised to find that the anthocyanin from the morning glory, Ipomoea tricolor Cav cv Heavenly Blue provided stable colors in food and beverage products at pH values ranging from about 2.0 to about 8.0. This display of stability, especially when the anthocyanin was incorporated into food and beverage products, was completely unexpected.

The recent delisting by the Food and Drug Administration of red dye #2 and red dye #4 and the uncertainty about red dye #40 presents the food processing industry with a serious problem regarding the coloring of such products as beverages, gelatin desserts, maraschino cherries, ice cream and confections. In view of these problems, our invention is an important contribution to the art and could be a much needed substitute for the artificial coloring agents now in use.

The colorant of the present invention is stable in the pH range where practically all anthocyanins are colorless. In the pH range of 2.0 to 5.0, colors that match very closely those of cherry, strawberry, raspberry, and grape are obtained. When refrigerated, the color range is extended to the blue colors by increasing the pH to 8.0 This colorant is suitable for use in beverages, gelatin desserts, toppings, icings, and various dairy products including ice cream, sherbert, and yogurt.

The stability of the colors obtained when the anthocyanin from 'Heavenly Blue' Morning Glory is used in food and beverage products, especially over a wide range of pH values, is a key element of this invention. Anthocyanin from other natural sources are known to color food and beverage products, but only at low pH values since, for the most part, they are virtually colorless above pH 3.0. As will be evident in the following exemplification of the invention; the colors, although stable, do show some fading by spectrophotometric determination. However, this fading is not detectable by the human eye. In fact, it is known that fading also occurs with polymeric food colors (Food Technology 31, 34-38, 1977). The color designations in the exemplification are according to the ISCC-MBS (Inter-Society Color Council-National Bureau of Standards) color-name charts, also known as Kelly's notations or the ISCC-MBS Method of Designating Colors and Dictionary of Color Names, Kenneth L. Kelly et al, National Bureau of Standards, Washington, D.C., November, 1955.

The anthocyanin from the morning glory, Ipomoea tri-color Cav cv Heavenly Blue was obtained by the process described in Phytochemistry 16, 1118-1119, 1977, which description is incorporated into this specification. The anthocyanin, cyanidin 3,5-diglucoside, from 'Better Times' Rose was obtained by the process described in the Journal American Society Horticultural Science 96, 770-773, 1971.

EXAMPLE 1

The stability, under conditions of light and darkness, of colors produced in a colorless commercially available carbonated soft drink by the anthocyanin from 'Heavenly Blue' Morning Glory and by that from 'Better Times' Rose was determined at two pH levels. Seven-Up was suitable for our purposes; however, any colorless beverage may be used.

9.0 mg. of each anthocyanin were added to individual 50 ml. volumes of colorless carbonated beverage. This concentration gave an acceptable color intensity and is considered to be an effective coloring amount of the anthocyanin. The pH of each solution was 3.35. The pH of duplicate solutions of each anthocyanin was adjusted with 0.1 M sodium citrate solution to 5.45. Half of the solutions at each pH value were placed in a dark environment (a closed drawer or cabinet) and half in an environment of diffused light (exposure to ordinary artificial and natural light in a laboratory or other room). The average temperature to which the solutions were exposed was from 23° to 26° C. Absorption spectra of the solutions exposed to diffused light were measured peroidically over a period of three weeks while those of the samples stored in the dark environment were measured at the beginning of the experiment, after three weeks and after 11 months.

The following results were obtained. The recorded colors were determined at the end of each experiment.
'Better Times' Rose Anthocyanin
1. The colors of the solutions having a pH of 3.35 were stable both in light and in darkness. According to Kelly's notations the color of each was #27, deep yellow pink. After 11 months there was only a 25.0% loss of color.
2. The solutions in which the pH was adjusted to 5.45 were unstable and both those which were exposed to light and those kept in the dark became virtually colorless. According to Kelly's notations the color of each was #252, pale purplish pink.

'Heavenly Blue' Morning Glory Anthocyanin
1. The color of the solutions having a pH of 3.35 was stable both in light and in darkness. According to Kelly's notations, the color of each was #254, vivid purplish red. After 11 months there was only an 11.0% loss of color.
2. The solutions in which the pH was adjusted to 5.45 remained highly colored. Both these solutions exposed to light and those kept in darkness lost approximately one-third of their original absorbance at the λ maximum after three weeks. However, the color loss was not perceptible to the human eye. According to Kelly's notations, the color of each was #238, deep reddish purple. After 11 months the color loss was 50.0%.

EXAMPLE 2

The stability under conditions of light and darkness, of colors produced in colorless citrate-phosphate buffer at a pH range of from 2.0 to 8.0 by the anthocyanin from 'Heavenly Blue' Morning Glory and by that from 'Better Times' Rose was determined. The citrate-phosphate buffer was made by mixing the following stock solutions in various proportions to obtain the proper or desired pH value:
 (a) 0.5 M sodium phosphate, debasic (71.01 g. dissolved and deluted to make 1 liter), and
 (b) 0.5 M citric acid (105.6 g. dissolved and deluted to make 1 liter).

0.6 mg. of each anthocyanin were added to individual 4.0 ml. volumns of citrate-phosphate buffer at pH levels ranging from 2.0 to 8.0. This concentration gave an acceptable color intensity and is considered to be an effective coloring amount of the anthocyanin. Each solution was sealed with parafilm in a 1.0 cm. pathlength disposable cuvette, the cuvette placed in a clear plastic container, and the container placed in a dark environment. A duplicate set of solutions was made up as just described and placed in an environment of diffused light as in Example 1. The average temperature to which the solutions were exposed was from 23° to 26° C. Absorption spectra of the solutions exposed to diffused light were measured periodically over a period of three weeks while those of the solutions stored in the dark environment were measured at the beginning and at the end of the three week experiment.

The following results were obtained. The recorded colors were determined at the end of each experiment.
'Better Times' Rose Anthocyanin
1. The colors of the solutions at pH 2.0 were stable both in light and in darkness. According to Kelly's notations the color of each was #34, vivid reddish orange.
2. The colors of the solutions at pH 3.0 were essentially stable. The solutions exposed to light and those kept in darkness lost only 16% and 9%, respectively, of the absorption at the λ maximum. According to Kelly's notation, the color was #26, strong yellowish pink.
3. All solutions at pH values of 4.0, 5.0, and 6.0 were colorless.
4. All solutions at pH values of 7.0 and 8.0 had an initial deep blue color, but the color rapidly decomposed and became colorless.

'Heavenly Blue' Morning Glory Anthocyanin
1. The color of the solutions at pH 2.0 was stable both in light and darkness. The color was darker and slightly bluer than Kelly's notation #3, deep pink.
2. The color of the solutions at pH 3.0 was stable both in light and in darkness and was slightly bluer than Kelly's notation #254, vivid purplish red.
3. The color of the solutions at pH 4.0 was stable both in light and in darkness. The color, according to Kelly's notations, was #255, strong purplish red.
4. The solutions at pH 5.0 were highly colored and according to Kelly's notation the color was #237, strong reddish purple. However, the solution exposed to light and that kept in darkness lost 31% and 24%, respectively, of the absorption at the λ maximum.
5. There was a perceptible loss of color from the solutions at pH 6.0. The solution exposed to light and that kept in darkness lost 70% and 67%, respectively, of the absorption at the λ maximum. According to Kelly's notations the color was #238, deep reddish purple.
6. The colors of the solutions at pH 7.0 were highly colored initially and according to Kelly's notations were #194, vivid purplish blue. However, after two days the color faded rapidly and at the end of three weeks both the solution exposed to light and that kept in darkness lost 93% of the absorption at the λ maximum.
7. The colors of the solutions at pH 8.0 were highly colored initially and according to Kelly's notations were #179, deep blue. After two days the color faded rapidly and at the end of three weeks both the solution exposed to light and that kept in darkness lost 90% of the absorption at the λ maximum.

EXAMPLE 3

The stability of colors produced in gelatin at a pH range of from 2.0 to 8.0 by the anthocyanin from 'Heavenly Blue' Morning Glory and by that from 'Better Times' Rose was determined.

0.6 mg. of each anthocyanin were added to individual 4.0 ml. volumes of hot citrate-phosphate buffer ranging in pH from 2.0 to 8.0 and then 60 mg. of a colorless gelatin was added. This concentration gave an acceptable color intensity and is considered to be an effective coloring amount of the anthocyanin. Each solution was placed in a 1 cm. pathlength disposable cuvette and the absorption spectra of each obtained prior to gelation. The solutions were placed in a refrigerator at 40° C. and allowed to gel. Absorption spectra of each gel was obtained periodically.

The followign results were obtained. The recorded colors were determined at the end of 320 hours.
'Better Times' Rose Anthocyanin
1. The only gels in which the color was stable were those at pH 2.0 and pH 3.0. According to Kelly's notations, the colors for the gels at pH 2.0 and pH 3.0, respectively, were #34, vivid reddish orange and #26, strong yellowish pink.

'Heavenly Blue' Morning Glory Anthocyanin

1. The color of all of the gels in the pH range of this example, 2.0–8.0, was stable for the 320 hours of this experiment. There was virtually no loss in color. According to Kelly's notations, the colors were as follows:

pH 2.0, #254, vivid purplish red (slightly redder)
pH 3.0, #245, vivid purplish red
pH 4.0, #257, very deep purplish red (slightly redder)
pH 5.0, #237, strong reddish purple
pH 6.0, #238, deep reddish purple
pH 7.0, #207, strong violet
pH 8.0, #179, deep blue.

We claim:
1. A colored composition comprising a food or beverage and a colorant, said colorant being the anthocyanin, peonidin 3-(dicaffeylsophoroside)-5-glucoside, said composition having a pH ranging from 2.0 to about 8.0 and said composition having a stable color ranging from purplish-red to blue.

2. A method of producing a stable color in a food or beverage product comprising adding to said product an effective coloring amount of an anthocyanin, peonidin 3-(dicaffeylsophoroside)-5-glucoside, and adjusting the pH of the product to between about 2.0 and about 8.0 to make the product a desired color from reddish purple to blue.

* * * * *